(12) United States Patent
Kim et al.

(10) Patent No.: US 9,218,346 B2
(45) Date of Patent: Dec. 22, 2015

(54) FILE SYSTEM AND METHOD FOR DELIVERING CONTENTS IN FILE SYSTEM

(75) Inventors: Seung Young Kim, Seoul (KR); O Jong Kim, Seoul (KR); Kyung Min Roh, Seoul (KR); Weon Gyo Jeong, Seoul (KR)

(73) Assignee: CDNETWORKS CO., LTD., Seoul (KR)

( * ) Notice: Subject to any disclaimer, the term of this patent is extended or adjusted under 35 U.S.C. 154(b) by 430 days.

(21) Appl. No.: 13/202,086

(22) PCT Filed: Feb. 12, 2010

(86) PCT No.: PCT/KR2010/000925
§ 371 (c)(1),
(2), (4) Date: Aug. 18, 2011

(87) PCT Pub. No.: WO2010/095836
PCT Pub. Date: Aug. 26, 2010

(65) Prior Publication Data
US 2011/0302242 A1    Dec. 8, 2011

(30) Foreign Application Priority Data

Feb. 18, 2009  (KR) .................. 10-2009-0013617
Jul. 7, 2009   (KR) .................. 10-2009-0061854

(51) Int. Cl.
*G06F 15/16* (2006.01)
*G06F 17/30* (2006.01)

(52) U.S. Cl.
CPC .............................. *G06F 17/30067* (2013.01)

(58) Field of Classification Search
CPC ..... H04L 65/4084; H04L 67/10; H04L 65/60; H04L 12/2812; H04L 67/06; H04L 65/104; H04L 67/1002; H04L 67/1095; H04L 67/2842; H04L 67/101; H04L 67/42; H04L 67/1021; H04L 2029/06054; H04L 67/1097; H04L 67/288; H04L 67/1014; H04L 67/327; H04L 67/1029; H04N 21/47202
USPC .......................................... 709/203
See application file for complete search history.

(56) References Cited

U.S. PATENT DOCUMENTS 6,510,469 B1 *  1/2003  Starnes et al. ............. 709/247
2001/0042073 A1 * 11/2001 Saether et al. ............. 707/203
(Continued)

FOREIGN PATENT DOCUMENTS

EP      0899662 A1 *  3/1999    ............ G06F 11/14
KR   10-2002-0070555 A    9/2002
(Continued)

OTHER PUBLICATIONS

PCT International Search Report and Written Opinion, PCT/KR2010/000925, Oct. 12, 2010, 9 Pages.

*Primary Examiner* — Douglas Blair
*Assistant Examiner* — Imran Moorad
(74) *Attorney, Agent, or Firm* — Fenwick & West LLP (57) ABSTRACT

The present invention relates to a file system, an apparatus in the file system thereof, and a method of providing and managing content in the file system thereof. According to the present invention, it may be possible to minimize data loss caused by server failure and to provide the convenience of data (content) management by (1) grouping overall data nodes (servers) to manage with a network server group including several data nodes (servers), (2) defining content management information, (3) storing and duplicating contents in each network server group using the defined content management information to maintain and manage the contents, (4) and maintaining and managing the contents in a file unit without using file chunks.

12 Claims, 4 Drawing Sheets

DATA GROUP IS REFERRED TO AS NETWORK SERVER GROUP.
DATA NODE IS REFERRED TO AS NETWORK SERVER.

(56) References Cited

U.S. PATENT DOCUMENTS

| | | | |
|---|---|---|---|
| 2001/0047400 A1* | 11/2001 | Coates et al. | 709/219 |
| 2002/0143798 A1* | 10/2002 | Lisiecki et al. | 707/200 |
| 2002/0147774 A1* | 10/2002 | Lisiecki et al. | 709/203 |
| 2002/0161855 A1* | 10/2002 | Manczak et al. | 709/219 |
| 2007/0174428 A1* | 7/2007 | Lev Ran et al. | 709/218 |
| 2009/0100128 A1* | 4/2009 | Czechowski et al. | 709/203 |
| 2009/0132621 A1* | 5/2009 | Jensen et al. | 707/205 |
| 2009/0144284 A1* | 6/2009 | Chatley et al. | 707/10 |
| 2009/0193147 A1* | 7/2009 | Lepeska | 709/241 |
| 2010/0235431 A1* | 9/2010 | Poluri et al. | 709/203 |

FOREIGN PATENT DOCUMENTS

| | | |
|---|---|---|
| KR | 10-2004-0001355 A | 1/2004 |
| KR | 10-2006-0128207 A | 12/2006 |
| WO | WO 03090106 A1 * | 10/2003 |

* cited by examiner

Fig. 1

DATA GROUP IS REFERRED TO AS NETWORK SERVER GROUP.
DATA NODE IS REFERRED TO AS NETWORK SERVER.

Fig. 2

DATA GROUP IS REFERRED TO AS NETWORK SERVER GROUP.
DATA NODE IS REFERRED TO AS NETWORK SERVER.

Fig. 3

DATA GROUP IS REFERRED TO AS NETWORK SERVER GROUP.
DATA NODE IS REFERRED TO AS NETWORK SERVER.

DATA GROUP IS REFERRED TO AS NETWORK SERVER GROUP.
DATA NODE IS REFERRED TO AS NETWORK SERVER.

Fig. 7

FILE SYSTEM AND METHOD FOR DELIVERING CONTENTS IN FILE SYSTEM

TECHNICAL FIELD

The present invention relates to a file system, and more particularly, to a cluster file system.

BACKGROUND ART

At present, a file transmission is performed in various ways through various communication networks, such as a mobile communication network as well as the Internet.

The term "file system" is referred to as a system for implementing a method of naming computer files, and logically locating them for storage and retrieval.

There are two types of file systems, Redundant Array of Inexpensive Disks (RAID) and Cluster File System.

The term "cluster file system" is referred to as a file system for clustering multiple independent nodes (servers) connected to a network into one, thereby providing a user with a single storage. RAID is a technology for multiplying capacity, speed, and stability by combining several physical disks into a single logical unit, whereas Cluster File System is a technology for implementing high capacity (several to several hundred TBs), broad bandwidth (several to several hundred Mbps), high availability (24*7 service), which cannot be approached by RAID, by combining several storage servers into one unit.

Figure 1:
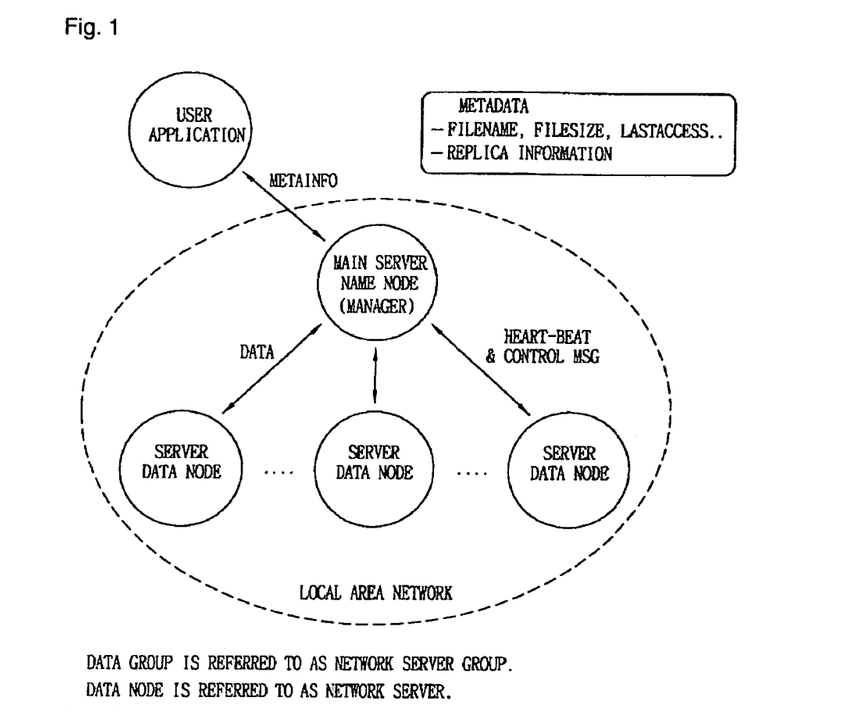
FIG. 1 is a block diagram illustrating a cluster file system in the related art.

FIG. 1 is a block diagram illustrating a typical cluster file system.

Referring to FIG. 1, data nodes (i.e., servers) in horizontal relationships within a local area network (LAN) are managed by a namenode using metadata. Here, the metadata includes information for managing data files such as filename, filesize, replica information, and the like.

As illustrated in FIG. 1, according to the related art, a file (i.e., content) is managed in a chunk unit to ensure a fast response speed in a web search engine or the like. In other words, according to a conventional cluster file system, content is distributed and copied into chunks, and stored in data nodes. As a result, according to a conventional cluster file system, in case of content delivery, the relevant chunks of the content are first collected at each data node, and then the collected chunks (i.e., content) should be transmitted. For example, when a user uploads specific content (data), the content is divided into chunks, and distributed and stored in data nodes. Furthermore, when the user downloads specific content, a namenode collects data that are distributed and stored in each data node, and then downloads the collected data to the user.

In a conventional cluster file system, undoubtedly, no problem will be presented in case where small-sized content is managed. However, if a large-capacity content file (for example, media file) is distributed and stored in data nodes in a conventional cluster file system, the number of chunks distributed and stored for the relevant file is increased, thereby causing a difficulty in distributively storing and collecting the chunks of the file.

Furthermore, a large-capacity content file that is distributed and stored into multiple chunks in this manner has a large number of chunks, and thus a separate repeater may be required when applied to a wide area network (WAN). Furthermore, when a conventional cluster file system is applied to a wide area network, there is a technical limit to the traffic expansion since the overall data nodes should be combined into a local segment.

As described above, when a typical cluster file system is grafted into an internet service environment, it may cause a difficulty in maintaining high availability (24*7 service) and flexibly processing traffic as the number of users increases and the contents become larger capacity.

DISCLOSURE OF INVENTION

Solution to Problem

In order to solve the problems in the related art as described above, according to the present invention, there is provided a file system and content service for grouping overall data nodes (i.e., grouping into "data groups") to manage and maintain content in a file unit, thereby ensuring high capacity and stability, which is fundamental for a cluster file system, and having large-capacity traffic processing capability and high availability.

In order to accomplish the foregoing object, it is characterized in that a method of providing each content in a file system according to the present invention comprises the steps of (A) receiving a content upload request from one or more users; (B) storing the content in one or more data groups using content management information in a manner that same content does not exist in one data group, wherein the network server group is configured with one or more data nodes; and (C) providing the content from the network server group when receiving a request for accessing the content from other users.

Preferably, it is characterized in that the method further comprises the step of delivering the stored content to one or more data groups.

Preferably, it is characterized in that the step (C) comprises the steps of calculating traffic for accessing the content requested from the users; and providing the requested content to the users through one or more acceleration servers when the calculated traffic is greater than a predetermined threshold value.

Preferably, it is characterized in that the method further comprises the steps of selecting the specific network server group in which the content is stored using the content management information when receiving the requests for accessing the content from the one or more users; and providing the content to the one or more users through the selected data group.

Preferably, it is characterized in that the content is stored in a file unit in the step (B).

Preferably, it is characterized in that the content management information includes at least one of load information, network server group information, file information, and replica state information.

Preferably, it is characterized in that the network server group and the one or more data groups maintain same content.

In order to accomplish the foregoing object, furthermore, it is characterized in that a content management method in a file system according to the present invention comprises the steps of (a) storing one or more contents uploaded from a plurality of users (i.e., one or more users) in a data group; (b) managing such that same content does not exist in the network server group using content management information related to the one or more contents; (c) duplicating the one or more contents stored in the network server group to one or more different data groups using the content management information; and (d) providing one or more specific contents to a plurality of users based on traffic for one or more requests for accessing the one or more specific contents when receiving the request for accessing the one or more specific content from a plurality of users.

Preferably, it is characterized in that the step (d) comprises the steps of calculating the traffic for the one or more requests for accessing the contents; selecting a network server group containing the one or more specific contents using the content management information and information related the calculated traffic; and providing the one or more specific content to the plurality of users from the selected data group.

Preferably, it is characterized in that the step (d) comprises the steps of calculating the traffic for the one or more requests for accessing the one or more specific contents; and providing the one or more specific contents to the plurality of users from one or more acceleration servers when the calculated traffic is greater than a predetermined threshold value.

Preferably, it is characterized in that the content management information includes at least one of load information, network server group information, file information, and replica state information.

In order to accomplish the foregoing object, furthermore, it is characterized in that a file management system according to the present invention comprises a plurality of data groups; and a management server for receiving one or more content upload requests from one or more user, selecting a network server group in which one or more contents are stored using content management information, storing the one or more contents in the selected data group, managing in a manner that same content does not exist in the selected data group, and duplicating the one or more contents stored in the selected network server group to one or more different data groups.

Preferably, it is characterized in that the network server group is configured by including at least one or more data nodes.

Preferably, it is characterized in that the same number and amount of contents are stored in the plurality of data groups, and each of the plurality of data groups does not contain the same content in a duplicate manner.

Preferably, it is characterized in that the management server calculates traffic for a request for accessing one or more contents, and provides the one or more specific content from one or more acceleration servers to the one or more users when the traffic for the one or more specific contents is greater than a predetermined threshold value.

Preferably, it is characterized in that each of the one or more contents is stored in a file unit in the selected data group.

Preferably, it is characterized in that the content management information includes at least one of load information, network server group information, file information, and replica state information.

Preferably, it is characterized in that the system further comprises one or more acceleration servers for receiving information on content having high traffic from the management server, storing the one or more contents, and providing the one or more contents to the plurality of users by a control of the management server.

In order to accomplish the foregoing object, furthermore, it is characterized in that an apparatus according to the present invention comprises a receiving unit for receiving one or more content upload requests from a plurality of users and the one or more contents; a management unit selecting a network server group in which the received contents are stored, generating content management information related to the contents, and managing such that same content does not exists in the network server group using the generated content management information; a transmission unit for transferring the contents stored in the network server group to one or more data groups to make their duplications using the content management information; and a processing unit for providing one or more specific contents to a plurality of users based on traffic for requesting of the one or more specific contents when receiving a request for accessing the one or more specific contents among the one or more contents from the plurality of users.

In order to accomplish the foregoing object, furthermore, it is characterized in that a recording medium according to the present invention performs an algorithm comprising the steps of (A) receiving one or more content upload request for uploading content from one or more users; (B) storing the requested one or more contents in one or more data groups using content management information in a manner that same content does not exist in one data group, wherein the network server group is configured with one or more data nodes; and (C) providing the one or more contents from the network server group when receiving a request for accessing the content from one or more users.

In order to accomplish the foregoing object, furthermore, it is characterized in that a recording medium according to the present invention performs a content management algorithm comprising the steps of (a) storing one or more contents uploaded from a plurality of users in a data group; (b) managing in a manner that same content does not exist in the network server group using content management information related to the contents; (c) duplicating the contents stored in the network server group to one or more different network server group using the content management information; and (d) providing one or more specific contents to a plurality of users based on traffic for a request for accessing the one or more specific contents when receiving the request for accessing the one or more specific contents from a plurality of users.

According to the present invention, it may be unnecessary to perform a collection and relaying process of data (content) since the content is stored in a file unit, not in a chunk unit, in such a way that overall data nodes (servers) are grouped into one or more data groups, and only one content (i.e., file) exists in each data group. According to the present invention, furthermore, it may be possible to ensure high capacity and stability, which is fundamental for a cluster file system, as well as to provide large-capacity traffic processing capability and high availability.

According to the present invention, furthermore, it may be possible to provide a WAN environment arrangement between data groups since a complete copy of a file is maintained in the network server group and there is no file collection process between the groups.

According to the present invention, furthermore, it may be possible to enhance convenience in a system management since content (data or file) is distributed to facilitate management thereof and data loss caused by node failure can be minimized.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

The present invention is applied to a cluster file system. However, the present invention is not limited to this specific implementation, and may be applicable to any data management and data delivery systems to which the technical spirit of the invention can be applied.

As various modifications can be made and diverse embodiments are applicable to the present invention, specific embodiments will be illustrated with reference to the accompanying drawings and described in detail in the detailed description. However, those specific embodiments should not be construed to limit the present invention, and should be construed as being extended to all modifications, equivalents, and substitutes included in the spirit and technological scope of the invention.

Describing each drawing, the same or similar constituent elements are designated with the same reference numerals. In describing the present invention, moreover, the detailed description will be omitted when a specific description for publicly known technologies to which the invention pertains is judged to obscure the gist of the present invention.

The terms including an ordinal number such as first, second, etc. can be used to describe various elements, but the elements should not be limited by those terms. The terms are used merely for the purpose to distinguish an element from the other element.

For example, a first element may be named to a second element, and similarly, a second element may be named to a first element.

Furthermore, it will be understood that the term "and/or" includes any and all combinations of one or more of the associated listed items.

In case where an element is "connected" or "linked" to the other element, it may be directly connected or linked to the other element, but another element may be existed therebetween.

On the contrary, in case where an element is "directly connected" or "directly linked" to another element, it should be understood that any other element is not existed therebetween.

It should be noted that the terms used herein are merely used to describe a specific embodiment, but not to limit the present invention.

Incidentally, unless clearly used otherwise, expressions in the singular number include a plural meaning. In this application, the term "comprising," "including," or the like, intend to express the existence of the characteristic, the numeral, the step, the operation, the element, the part, or the combination thereof, and do not intend to exclude another characteristic, numeral, step, operation, element, part, or any combination thereof, or any addition thereto.

Unless defined otherwise, the terms used herein including technological or scientific terms have the same meaning that is generally understood by those ordinarily skilled in the art to which the invention pertains.

The terms used herein shall not be interpreted not only based on the definition of any dictionary but also the meaning that is used in the field to which the invention pertains. Also, unless clearly defined, the terms used herein shall not be interpreted too ideally or formally.

Hereinafter, the premises and technical terms for describing the present invention will be described.

A network server (or data node, hereinafter, referred to as 'data node' for a sake of explanation) corresponds to a storage server. It corresponds to a device for storing uploaded data (or content). One or more data nodes may be a constituent element of a network server group.

A user may be an end user or a content provider for delivering content to a system according to the present invention.

A network server group (or data group, hereinafter, referred to as 'data group' for a sake of explanation) is a storage group including one or more data nodes (i.e., one or more network servers). The data group includes a plurality of data nodes, and specific content (data) is not managed by the standard of data nodes, but by the standard of data groups. In other words, if three storage nodes (for example, a first data node, a second data node, and a third data node) are included in a data group (i.e., network server group), then specific data (for example, content A) is stored in only any one of the three data nodes. That is to say, the specific data is managed in such a way that only one exists in a data group, namely, same content (or contents) does not exist in a data group. In other words, each data group including a plurality of data nodes is managed in such a way that same content does not exist therein.

Figure 6:
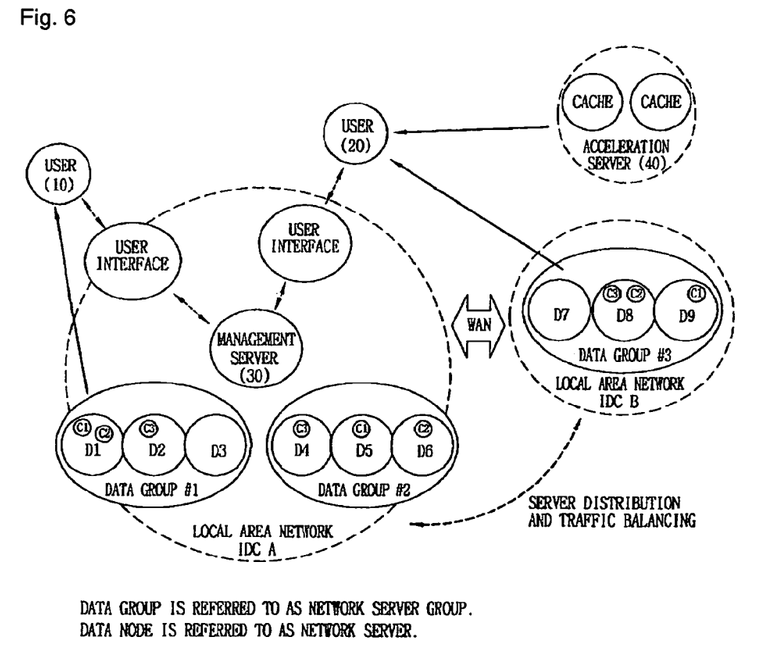
FIG. 6 is a block diagram illustrating a file system according to an embodiment of the present invention.

According to the present invention, a network may be a local area network (LAN) or a network such as WAN. On the other hand, according to the present invention, a network may be configured with LANs and WANs in a mixed way. For example, a network may be a LAN in a narrow sense, and may be an Internet data center (IDC) including a plurality of data groups in a broad sense, and may include all network elements (for example, network elements as illustrated in FIG. 6) in a system provided by the technology of the present invention.

The data group may transmit specific content (data) for a copy to a data group within the same network (for example, local network in Seoul) or to a data group in another network (for example, local network in New York).

A management server is a network entity for managing in such a way that contents (data) are stored in a data group, and duplicated to another data group node in a file unit using content management information (or file management information).

An acceleration server is a device for rapidly delivering content having high traffic or a specific event to a user by a control of a management server, and it may be a cache server or may exist as a separate data node for managing contents having the specific event. Furthermore, the acceleration server may be employed by configuring it as an element within a network (for example, LAN or IDC group), or within a data group, or configuring it as an independent network element.

Contents management information is information that is used by a management server to store contents (data) into a data group in a file unit, and duplicating contents to another data group. The contents management information includes load information, data group information, file information, and replica state information. The contents management information is defined by the present invention, and generated by a management server.

The contents management information will be described as follows.

1) Load information is load information related to contents uploaded by a user, and includes information such as disk I/O, session count check, ranking (i.e., hit count check), and the like.

2) Data group information includes data group where the contents will be stored or is stored, that is, location of the data group and location of the data node within the data group, operating status of the data group (existence or nonexistence of failure), stored time and data node ID, data group ID, network ID, and the like.

3) File information includes information such as file ID for the relevant contents (or content), status (for example, normal, deleted, temporary reserved), file size, generated time, file type, codec, and the like. Furthermore, the file information includes concurrent user count check information (i.e., information by which the session number can be checked on a program), hit count check information (i.e., information by which the number of instantaneous hits or the number of accumulated hits for specific file or content can be checked), and disk I/O check information, and ranking information.

4) Replica state information includes duplicated count and duplicated time, duplicated file ID, duplicated location information (for example, data group ID and datanode ID within the data group, or duplicated location information for an acceleration server, and the like), distribution request information, and the like.

Hereinafter, the basic concept and detailed embodiments according to the present invention will be described based on the above-mentioned technical terms of the present invention.

According to the basic concept of the present invention, (1) overall data nodes are not viewed horizontally but managed in groups, (2) one copy per each group (i.e., data group) is maintained for a copy of content (for example, video data or image file uploaded by a user), and (3) contents management information is defined for this purpose. Furthermore, (4) according to the present invention, the copy of the content is stored in a file unit, not using file chunks, and (5) distributed and duplicated (copied) to other groups, and an acceleration server (for example, cache or dedicated storage server or device) will be implemented when a lot of requests are received from a plurality of users.

Hereinafter, a preferred embodiment according to the present invention will be described in detail with reference to the accompanying drawings. The constituent elements designated with the same reference numerals in the drawings will perform the same operations and functions and their redundant description will be omitted.

Figure 2:
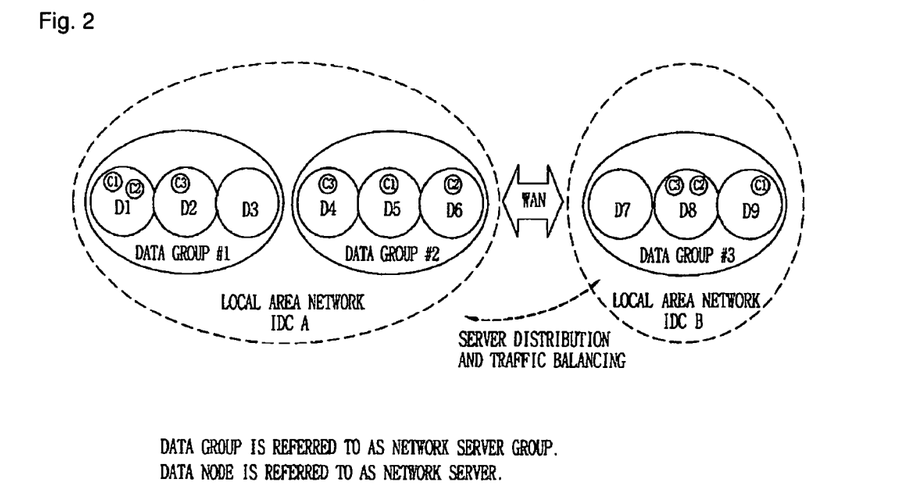
FIG. 2 is a schematic block diagram illustrating a file system according to an embodiment of the present invention.

FIG. 2 is a schematic block diagram illustrating a file system according to an embodiment of the present invention. It is illustrated in FIG. 2 that contents (data) are managed by each data group, and in which data node the contents are stored within the data group. It is illustrated in FIG. 2 that there exist Internet data center (IDC) A and IDC B as local networks, and the local networks are established in a wide area network (WAN) environment. Furthermore, as illustrated in FIG. 2, there exist data group #1 and data group #2 in the IDC A, and also there exists data group #3 in the IDC B. Furthermore, it illustrated in FIG. 2 that each data group includes three data nodes (storage servers). In other words, as illustrated in FIG. 2, the data groups #1, #2, and #3 include data nodes D1-D3, D4-D6, and D7-D9, respectively. Furthermore, as illustrated in FIG. 2 that c1, c2, and c3 stored in the data nodes within the data group are different contents (data) from one another, and uploaded or delivered by a user (for example, an end user or content provider). However, the c1, c2, and c3 are stored in the data nodes, not in a chunk unit, but in a file unit.

As illustrated in FIG. 2, if the contents c1 and c2 are stored in D1 among the data nodes of data group #1 and the content c3 is stored in D2 of data group #1, then the contents (c1, c2, and c3) may be duplicated to data group #2 as illustrated in FIG. 2. In other words, c1, c2, and c3 are duplicated and distributively stored in D5 of data group #2, D6 of data group #2, and D4 of data group #2, respectively. On the other hand, the contents (c1, c2, and c3) stored in data group #1 may be duplicated and stored in data group #3 of the local network IDC B arranged in a WAN environment. As an example of FIG. 2, c1 is transmitted to D9 of data group #3, and c2 and c3 are transmitted to D8 of data group #3, respectively, and therefore, each copy of the content will be stored in a file unit.

According to the present invention, as illustrated in FIG. 2, contents are stored and duplicated for each data group in a file unit, and thus it is managed and maintained such that only one same content (data or file) exists in the same data group, namely same content does not exist in the same data group.

Figure 3:
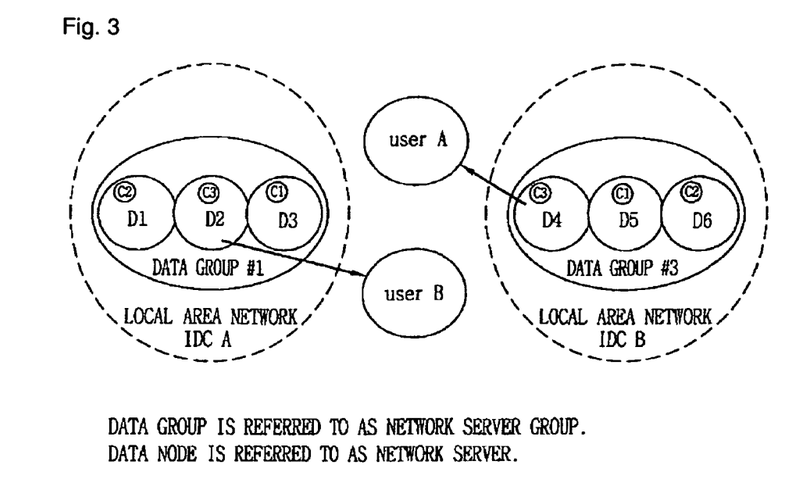
FIG. 3 is a block diagram illustrating a file system according to an embodiment of the present invention.

FIG. 3 is a block diagram illustrating a file system according to an embodiment of the present invention. FIG. 3 is a block diagram in which content (data) stored in a data group is delivered to a user by managing the content in a file unit. In other words, as illustrated in FIG. 3, same content is not stored in a duplicate manner in the data group, but specific content is stored by only one each. As a result, when there is a user's request, the content (for example, video file) requested by the user will be directly delivered in a file unit for each data group.

As illustrated in FIGS. 2 and 3, according to the present invention, data (content) is stored in a file unit, and therefore, it may be unnecessary to perform a collection and relaying process of data in which chunks of the content are collected. Furthermore, a complete copy of a file (i.e., a file corresponding to the content) is maintained in a data group and no file chunk collection process is required, and therefore, a WAN environment arrangement between data groups may be easily implemented. Such a structure according to the present invention may facilitate a distribution management for servers (i.e., data nodes), and minimize data loss caused by datanode (or server) failure. Furthermore, according to the present invention, the contents in a data group can be downloaded at the user's discretion, thereby enhancing the convenience of management.

Figure 4:
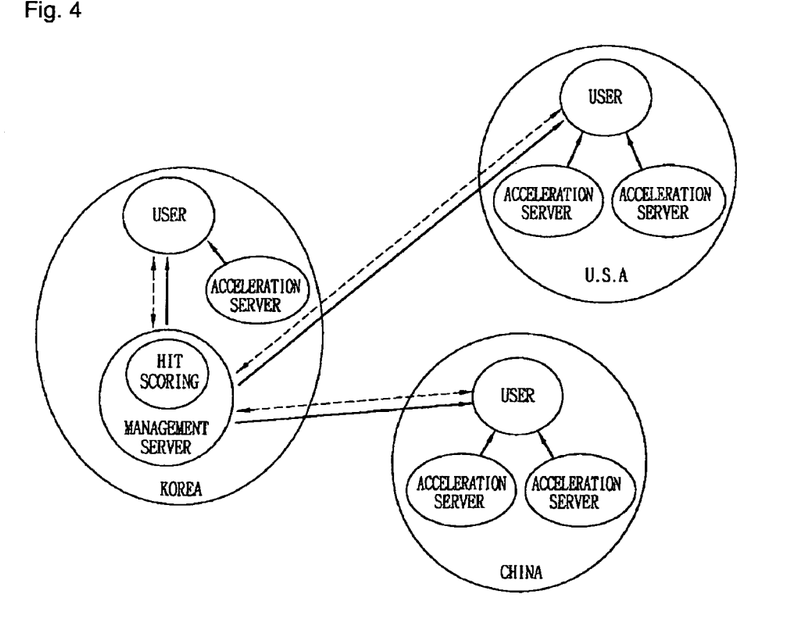
FIG. 4 is a block diagram illustrating a file system to which an acceleration server is applied according to an embodiment of the present invention.

FIG. 4 is a block diagram illustrating a file system to which an acceleration server is applied according to an embodiment of the present invention.

An example is illustrated in FIG. 4 that acceleration servers are configured in a Korea network, a China network, and a U.S.A. network, respectively.

As illustrated in FIG. 4, an acceleration server may be applicable when there is high traffic or event traffic for specific content. In other words, the traffic for the content having high traffic is routed through an external acceleration server to balance the traffic concentrated on the specific content, thereby enhancing the performance of a system.

As illustrated in FIG. 4, a management server calculates the number of hits, i.e., traffic concentrated on specific content in each network, and an acceleration server will be implemented when the traffic (i.e., hit count) is greater than a threshold value. In other words, the content on which traffic is concentrated is stored in the acceleration server and delivered to the users.

In FIG. 4, when the traffic for specific content is concentrated in U.S.A. or China, a management server arranged in Korea may route the specific content to the user in the relevant data group in U.S.A. or China. Furthermore, an acceleration server may be configured in each data group or network to deliver the content having high traffic or event traffic to the user.

For example, when traffic is concentrated on the content in a specific data group in Korea, the management server may deliver the requested content through an acceleration server to the requested user. For an another example, the content may be delivered through an acceleration server in another data group or an acceleration server that is managed by overall networks. In other words, when traffic is concentrated on specific content requested by the users subscribed for a China or U.S.A. network in FIG. 4, the requested contents may be delivered to the users accessed to the China or U.S.A. network through the acceleration server accessed to the Korea network. Hereinafter, the function and operation of an acceleration server will be described in detail with reference to FIG. 6.

Figure 5:
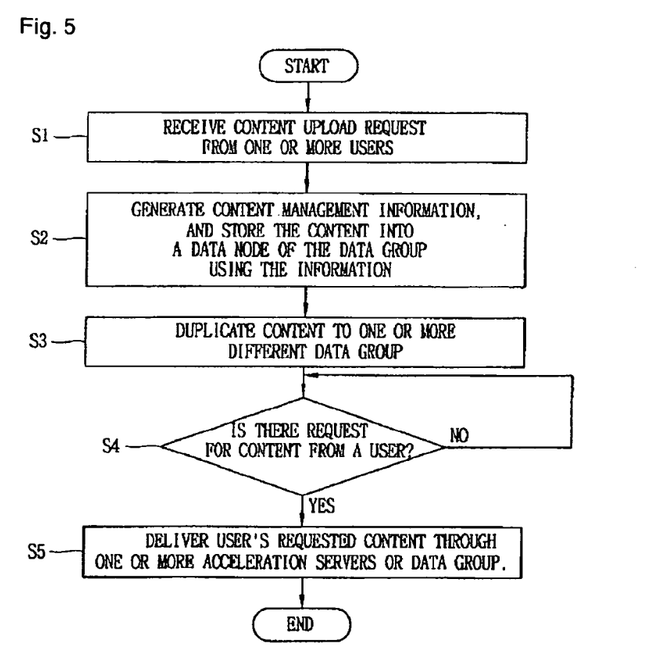
FIG. 5 is a flow chart illustrating a method of providing content in a file system according to another embodiment of the present invention.

FIG. 5 is a flow chart illustrating a method of providing content in a file system according to another embodiment of the present invention.

Figure 7:
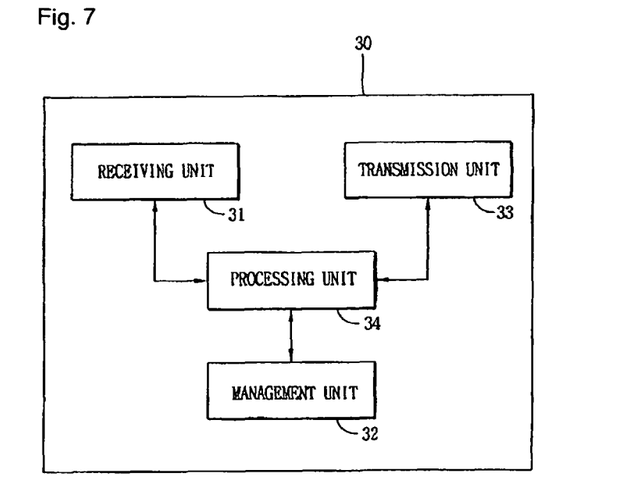
FIG. 7 is a block diagram schematically illustrating an apparatus in a file management system according to an embodiment of the present invention.

FIG. 6 is a block diagram illustrating a file system according to an embodiment of the present invention. FIG. 7 is a view to which the embodiments of FIGS. 2 and 4 are applied. In addition, FIG. 6 is a view illustrating an embodiment of the present invention in order to summarize the description of the present invention.

Hereinafter, it will be described with reference to FIGS. 5 and 6.

When a user 10 sends an upload request for content (for example, c1 as video data) to a network (IDC A), a management server 30 receives this request (i.e., content upload request) through a user interface (S1). The management server 30 generates content management information (or file management information) using the information of the content (i.e., c1) and the information of network constituent elements. The management server 30 determines a data group (for example, data group #1) and a data node (i.e., one of D1, D2, and D3) within the data group (for example, data group #1) in which the content is stored, using the content management information, and stores the content, not in a chunk unit but in a file unit, into the determined data node (S2). In other words, one file corresponding to the content is not divided into a plurality of file chunks to be distributed and stored in the data nodes (i.e., D1, D2, and D3), but one file corresponding to the content is stored in one data node, which has been determined among the data nodes (i.e., D1, D2, and D3). Similarly, on the other hand, the management server 30 stores other contents (for example, c2 and c3) into the data nodes within the data group using the content management information through the processes of S1 and S2. At this time, the management server 30 manages in such a way that only one content exists in the data group when storing the contents (c1, c2, and c3).

The management server 30 transmits (or delivers) the contents (c1, c2, and c3) stored in data group #1 to duplicate them to data group #2 and data group #3 (S3). When the management server 30 transmits the contents to one or more different data groups for duplication, they may be transmitted (delivered) whenever the content is stored into a data node or at every predetermined period. Furthermore, the management server 30 may store the contents (c1, c2, and c3) into one data node within a data group in the same network (for example, IDC A), and then deliver (transmit) them to one or more different data groups for duplication. On the other hand, when the transmission of the contents are performed by another network, it may be performed through a WAN environment between networks. Such a content duplication and transmission between networks allows to implement a traffic balancing and contents delivery network (CDN).

Furthermore, the management server 30 may control such that the content is transferred (delivered) from one data group (for example, data group #1) to another data group (for example, data group #2), or as another example, it may receive the content stored in one data group (for example, data group #1) and directly transfer to one or more different data group (for example, data group #2).

When receiving a request for accessing the content (for example, c1) from other users 20 (S4), the management server 30 selects a data group by considering traffic among the data groups (data group #1 or #2 in FIG. 4) in which the content (for example, c1) is stored, and allows the selected data group to deliver the content to the user 20 (S5). For example, if traffic is concentrated on data group #1 and data group #2, then the management server 30 may perform a traffic balancing. In other words, the management server 30 may control such that data group #3 of another network (for example, IDC B) delivers the content to the another user 20.

On the other hand, when receiving a request for accessing the content (for example, c1) from the other users, the management server 30 calculates the number of hits concentrated on the content during a predetermined period of time. Furthermore, when the calculated traffic is greater than a predetermined threshold value, the management server 30 determines it as high traffic for which an acceleration server 40 should be used, and allows the acceleration server 40 to deliver the content (for example, c1) in a file unit to the other users (S5). Accordingly, the management server 30 checks the number of hits for specific content to determine the hit ranking of the contents stored in the data nodes of a data group, and duplicates the contents corresponding to a specified rank of the determined ranking to the acceleration server 40. On the other hand, the relevant contents will be automatically cached when the acceleration server 40 is a cache.

On the other hand, an embodiment is illustrated in FIG. 6, in which the acceleration server 40 is extended into an independent server. However, the acceleration server 40 may be configured within a IDC network or within a data group. The process S5 delivers the content requested by the user 10 or 20 in a file unit, and therefore, it is not required to perform a procedure of collecting and relaying data as in case where content is made of file chunks.

Hereinafter, a file management system according to the present invention will be described.

The file management system according to the present invention is configured by including a plurality of data groups; and a management server for receiving a content upload request from a user, selecting a data group in which the content is stored using content management information, storing the content in the selected data group, managing in such a way that only the one content exists in the selected data group, and duplicating the contents stored in the selected data group to other data groups.

The file management system according to the present invention is configured by further including an acceleration server for receiving content information with high traffic from the management server, storing the content, and providing the content to the plurality of users by a control of the management server.

Each of the data groups is configured by including one or more data nodes (storage servers).

The same number and amount of contents are stored in the data groups, and each of the data groups maintains and stores same contents by duplicating them to one another, and does not contain the same content in a duplicate manner.

The management server calculates traffic for a request for accessing content, and provides the specific content from an acceleration server to the user when the traffic for specific content is greater than a predetermined threshold value. In addition, each function of the constituent elements in a file management system according to the present invention has been described as illustrated in FIGS. 2 through 6.

FIG. 7 is a block diagram schematically illustrating an apparatus in a file management system according to an embodiment of the present invention.

Hereinafter, a file management apparatus according to the present invention will be described with reference to FIG. 7.

An apparatus 30 according to the present invention is configured by a receiving unit 31 for receiving requests for uploading contents from a plurality of users and their contents; a management unit 32 selecting a data group in which the received contents are stored, generating file management information (content management information) related to the contents, and managing in a manner that same content does not exists in the data group using the generated file management information; a transmission unit 33 for delivering (transferring) the contents stored in the data group to one or more different data groups to make their duplications using the file management information; and a processing unit 34 for providing one or more specific contents to a plurality of users based on traffic for specific content request when receiving a request for accessing the specific content among the contents from the plurality of users. In addition, the apparatus 30 includes a fundamental hardware (for example, input unit, output unit, storage unit, and the like) and a software (for example, driver) for implementing the present invention. Such a configuration includes devices required for an apparatus in the technical field of the present invention, and it will become apparent for those skilled in the art, and thus the detailed terms and functions thereof will be omitted.

Although the present invention has been described with reference to the embodiments as illustrated in the drawings, these are merely illustrative, and it should be understood by those skilled in the art that various modifications and equivalent other embodiments of the present invention can be made. Consequently, the true technical protective scope of the present invention should be determined based on the technical spirit of the appended claims.

The invention claimed is:

1. A computer-implemented method of providing contents in a file system, the method comprising:
grouping a plurality of storage servers into a network server group;
receiving a content upload request from a user, the content upload request including content;
generating content management information based on information of the content;
determining the network server group and a specific storage server within the determined network server group to store the content based on the generated content management information;
storing the content in the determined storage server included in the determined network server group, wherein the content is managed by the determined network server group and is stored in a file unit, and is not stored in other storage servers within the determined network server group;
responsive to storing the content in the determined storage server or responsive to a predetermined time period, transmitting the content stored in the determined network server group to one or more different network server groups to duplicate the content in the one or more different network server groups in the file unit;
receiving a request for accessing the content from other users;
calculating traffic for accessing the content, the traffic describing a number of requests for the content during a period of time;
selecting a network server group by considering both traffic among network server groups in which the content is stored and the content management information and delivering the content stored in the selected network server group to the other users;
responsive to the traffic being greater than a threshold:
duplicating the content to an acceleration server in the file unit; and
providing the content in the file unit through the acceleration server in response to requests for accessing the content from the other users,
wherein the content management information includes load information, data group information, file information, and replica state information.

2. The method of claim 1, wherein the data group information includes a data group where the content is stored, a location of the data group and location of a data node within the data group, operating status of the data group, a time when the content was stored and a data node identifier (ID) for the data node, a data group ID of the data group, or a network ID.

3. The method of claim 1, wherein the replica state information includes a duplicated count and a time when the content was duplicated, a duplicated file ID, duplicated location information and distribution request information.

4. The method of claim 1, wherein the determined network server group and the one or more different network server groups maintain same content.

5. A computer-implemented method in a file system, the method comprising:
grouping a plurality of storage servers into a network server group;
receiving a content upload request from a user, the content upload request including content;
generating content management information based on information of the content;
determining the network server group and a specific storage server within the determined network server group to store the content based on the generated content management information;
storing the content in the determined storage server included in the determined network server group, wherein the content is managed by the determined network server group and is stored in a file unit, and is not stored in other storage servers within the determined network server group;
responsive to storing the content in the determined storage server or responsive to a predetermined time period, duplicating the content stored in the determined network server group to one or more different network server groups in the file unit;
calculating traffic for accessing the content, the traffic describing a number of requests for the content during a period of time;
selecting a network server group by considering both traffic among network server groups in which the content is stored and the content management information and providing the content stored in the selected network server group to the other users;
responsive to the traffic being greater than a threshold:
duplicating the stored content to an acceleration server in a file unit; and
providing the content in the file unit through the acceleration server in response to requests for accessing the content from one or more users,
wherein the content management information includes load information, data group information, file information, and replica state information.

6. The content management method of claim 5, the data group information includes a data group where the content is stored, a location of the data group and location of a data node within the data group, operating status of the data group, a time when the content was stored and a data node identifier (ID) for the data node, a data group ID of the data group, or a network ID.

7. The content management method of claim 5, wherein the replica state information includes a duplicated count and a time when the content was duplicated, a duplicated file ID, duplicated location information and distribution request information.

8. A file management system, the system comprising:
one or more network server groups, each network server group including a plurality of storage servers; and
a management server comprising:
a processor; and
a non-transitory computer-readable storage medium storing computer instructions configured to perform steps comprising:
receiving a content upload request from a user, the content upload request including content;
generating content management information based on information of the content;
selecting a network server group from the one or more network server groups and a specific storage server within the selected network server group in which to store the content based on the generated content management information,
storing the content in the storage server included in the selected network server group, wherein the content is managed by the selected network server group and is stored in a file unit, and is not stored in other storage servers within the selected network server group;
responsive to storing the content in the selected storage server or responsive to a predetermined time period, duplicating the content stored in the selected network server group to one or more different network server groups to duplicate the content in the one or more different network server groups in the file unit;
receiving a request for accessing the content from other users;
calculating traffic for accessing the content, the traffic describing a number of requests for the content during a period of time;
selecting a network server group by considering both traffic among network server groups in which the content is stored and the content management information and delivering the content stored in the selected network server group to the other users; and
an acceleration server comprising configured for:
a processor; and
a non-transitory computer-readable storage medium storing computer instructions configured to perform steps comprising:
storing the content responsive to the traffic being greater than a threshold in the file unit; and
providing the content in the file unit in response to requests for accessing the content from one or more users,
wherein the content management information includes load information, data group information, file information, and replica state information.

9. The file management system of claim 8,
wherein the data group information includes a data group where the content is stored, a location of the data group and location of a data node within the data group, operating status of the data group, a time when the content was stored and a data node identifier (ID) for the data node, a data group ID of the data group, or a network ID.

10. The file management system of claim 8, wherein the replica state information includes a duplicated count and a time when the content was duplicated, a duplicated file ID, duplicated location information and distribution request information.

11. An apparatus comprising:
a processor; and
a non-transitory computer-readable storage medium storing computer instructions configured to perform a computer-implemented method, the method comprising:
grouping a plurality of storage servers into a network server group;
receiving a content upload request from a user, the content upload request including content;
generating content management information based on information of the content;
determining the network server group and a specific storage server within the determined network server group to store the content, based on the generated content management information;
storing the content in the determined storage server included in the determined network server group, wherein the content is managed by the determined network server group and is stored in a file unit, and is not stored in other storage servers within the determined network server group;
responsive to storing the content in the determined storage server or responsive to a predetermined time period, transmitting the content stored in the determined network server group to one or more different network server groups to duplicate the content in the one or more different network server groups in the file unit;
receiving a request for accessing the content from other users;
calculating traffic for accessing the content, the traffic describing a number of requests for the content during a period of time;
selecting a network server group by considering both traffic among network server groups in which the content is stored and the content management information and delivering the content stored in the selected network server group to the other users;
responsive to the traffic being greater than a threshold:
duplicating the content to an acceleration server in the file unit; and providing the content in the file unit through the acceleration server in response to requests for accessing the content from the other users, wherein the content management information includes load information, data group information, file information, and replica state information.

12. A non-transitory recording medium storing computer instructions configured to perform a computer-implemented method, the method comprising:

grouping a plurality of storage servers into a network server group;

receiving a content upload request from a user, the content upload request including content;

generating content management information based on information of the content;

determining a the network server group and a specific storage server within the determined network server group to store the content based on the generated content management information;

storing the content in the determined storage server included in the determined network server group, wherein the content is managed by the determined network server group and is stored in a file unit, and is not stored in other storage servers within the determined network server group;

responsive to storing the content in the determined storage server or responsive to a predetermined time period, transmitting the content stored in the determined network server group to one or more different network server groups to duplicate the content in the one or more different network server groups in the file unit;

receiving a request for accessing the content from other users;

calculating traffic for accessing the content, the traffic describing a number of requests for the content during a period of time;

selecting a network server group by considering both traffic among network server groups in which the content is stored and the content management information and delivering the content stored in the selected network server group to the other users;

responsive to the traffic being greater than a threshold:

duplicating the content to an acceleration server in the file unit; and providing the content in the file unit through the acceleration server in response to requests for accessing the content from the other users, wherein the content management information includes load information, data group information, file information, and replica state information.

* * * * *